United States Patent
Bodden et al.

(10) Patent No.: US 8,201,424 B2
(45) Date of Patent: Jun. 19, 2012

(54) SYNTHETIC REDUNDANCY VIA PROGNOSTICS

(75) Inventors: David S. Bodden, Fort Worth, TX (US); William E. Grube, Benbrook, TX (US); Robert W. Hadden, Highland Village, TX (US); Nathan S. Clements, Fort Worth, TX (US)

(73) Assignee: Lockheed Martin Corporation, Bethesda, MD (US)

(*) Notice: Subject to any disclaimer, the term of this patent is extended or adjusted under 35 U.S.C. 154(b) by 410 days.

(21) Appl. No.: 12/358,124

(22) Filed: Jan. 22, 2009

(65) Prior Publication Data
US 2010/0180418 A1    Jul. 22, 2010

(51) Int. Cl.
    G06F 19/00    (2011.01)
    G06F 17/40    (2006.01)
(52) U.S. Cl. ............ 70/34; 702/182; 702/187; 702/189
(58) Field of Classification Search ............... 73/432.1, 73/865.8, 865.9; 340/500, 540, 635, 653, 340/679; 702/1, 33, 34, 127, 182, 183, 184, 702/187, 189; 714/1, 47.1, 47.2, 47.3, 100
    See application file for complete search history.

(56) References Cited

U.S. PATENT DOCUMENTS

| | | | | |
|---|---|---|---|---|
| 2,883,255 | A * | 4/1959 | Anderson | 346/34 |
| 3,237,448 | A * | 3/1966 | Howell et al. | 702/132 |
| 3,362,217 | A * | 1/1968 | Rush et al. | 73/112.01 |
| 5,710,578 | A * | 1/1998 | Beauregard et al. | 345/441 |
| 6,691,007 | B2 | 2/2004 | Haugse et al. | |
| 6,845,952 | B2 | 1/2005 | Abel et al. | |
| 6,847,854 | B2 | 1/2005 | Discenzo | |
| 6,907,416 | B2 | 6/2005 | Tasooji et al. | |
| 7,050,873 | B1 * | 5/2006 | Discenzo | 700/99 |
| 7,577,548 | B1 * | 8/2009 | Przytula et al. | 702/182 |
| 7,725,293 | B2 * | 5/2010 | Bonissone et al. | 702/183 |
| 7,797,062 | B2 * | 9/2010 | Discenzo et al. | 700/28 |
| 2002/0184178 | A1 | 12/2002 | Tasooji et al. | |
| 2003/0061004 | A1 * | 3/2003 | Discenzo | 702/182 |
| 2004/0135034 | A1 | 7/2004 | Abel et al. | |
| 2004/0176887 | A1 | 9/2004 | Kent et al. | |
| 2004/0267395 | A1 * | 12/2004 | Discenzo et al. | 700/99 |
| 2005/0137764 | A1 | 6/2005 | Alvarez-Troncoso et al. | |
| 2006/0004499 | A1 | 1/2006 | Trego et al. | |
| 2008/0140361 | A1 * | 6/2008 | Bonissone et al. | 703/2 |
| 2009/0204234 | A1 * | 8/2009 | Sustaeta et al. | 700/29 |
| 2009/0204237 | A1 * | 8/2009 | Sustaeta et al. | 700/36 |
| 2009/0204245 | A1 * | 8/2009 | Sustaeta et al. | 700/99 |
| 2009/0204267 | A1 * | 8/2009 | Sustaeta et al. | 700/291 |
| 2009/0210081 | A1 * | 8/2009 | Sustaeta et al. | 700/99 |
| 2010/0306001 | A1 * | 12/2010 | Discenzo et al. | 705/7 |

OTHER PUBLICATIONS

David S. Bodden, PHM as a Design Variable in Air Vehicle Conceptual Design, Aerospace Conference, 2005 IEEE, Mar. 5-12, 2005, pp. 1-11, Iee, Big Sky, MT.

* cited by examiner

*Primary Examiner* — Edward Cosimano
(74) *Attorney, Agent, or Firm* — Bracewell & Giuliani LLP

(57) ABSTRACT

An manufacturing method that uses synthetic redundancy to optimize equipment reliability, performance, weight, and cost. The manufacturing method identifies critical components, that would ordinarily require a redundant component to meet reliability and safety requirements, and replaces them with a single, non-redundant component. Safety and reliability is maintained by using prognostic health management to replace the non-redundant critical component prior to its failure. Verification techniques are used to ensure reliability requirements are being met.

20 Claims, 11 Drawing Sheets

SYNTHETIC REDUNDANCY VIA PROGNOSTICS

BACKGROUND

This disclosure relates to establishing reliability in a system through synthetic redundancy, in lieu of physical redundancy. Physical redundancy increases weight, complexity, and cost of a system. It is desirable to avoid physical redundancy and still maintain system reliability.

DETAILED DESCRIPTION

Figure 1:
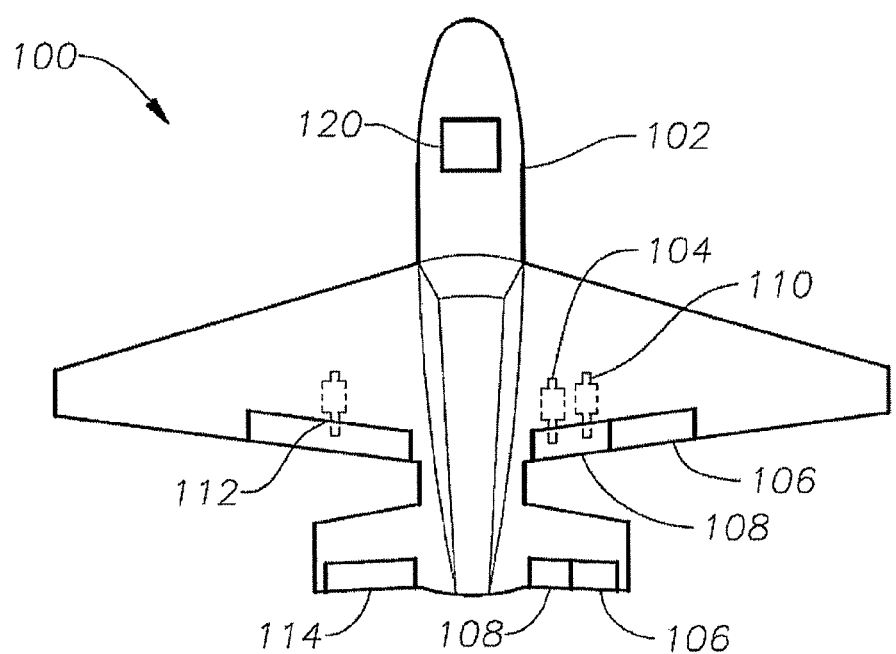
FIG. 1 is an illustration of an exemplary embodiment of an aircraft equipped with a synthetic redundancy system.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring to FIG. 1, an exemplary embodiment of a system 100 for establishing prognostic health management ("PHM") and synthetic redundancy includes an aircraft 102 with one or more critical components such as flight control surfaces 106, actuators 104, flight control computers, sensors, and the like. An aircraft 102 is used for illustrative purposes, but the synthetic redundancy system can be used on any type of equipment. In an exemplary embodiment, a critical component is a component that, if it were to fail during flight, may cause the loss of the aircraft 102. A critical component could be a component that prevents the aircraft 102 from operating. A critical component may require a redundant component 108 on the aircraft 102, or a redundant critical sub-component 110 of the critical component so that in the event of a failure of the primary component or sub-component, the aircraft may still operate using the redundant component or sub-component. In an exemplary embodiment, a critical component is a flight control surface 106, 108, or sub-component that is necessary for a critical component to operate, such as an actuator 104, 110. When synthetic redundancy is used for non-aircraft equipment, a critical component could be, for example, a component the failure of which would stop the piece of equipment from operating. Examples of critical sub-components include an actuator that moves a flight control surface, an air data sensor, a pump on a chemical distribution system, a temperature sensor on a reactor vessel, and the like.

The system 100 for synthetic redundancy may be used to facilitate synthetic redundancy, which identifies critical components that would ordinarily require redundancy and replaces them with a single component 112, 114. A component in this context includes a sub-component of a critical component, wherein a redundant sub-component may be replaced with a single sub-component. Furthermore, synthetic redundancy may be used to replace a triplex-redundant component with a duplex-redundant component. The system establishes reliability of the aircraft by ordering the replacement of the synthetically redundant component ("SRC") 112, 114 prior to its failure. The system may include an on-board computer 120 to process real-time data regarding the aircraft.

Figure 2:
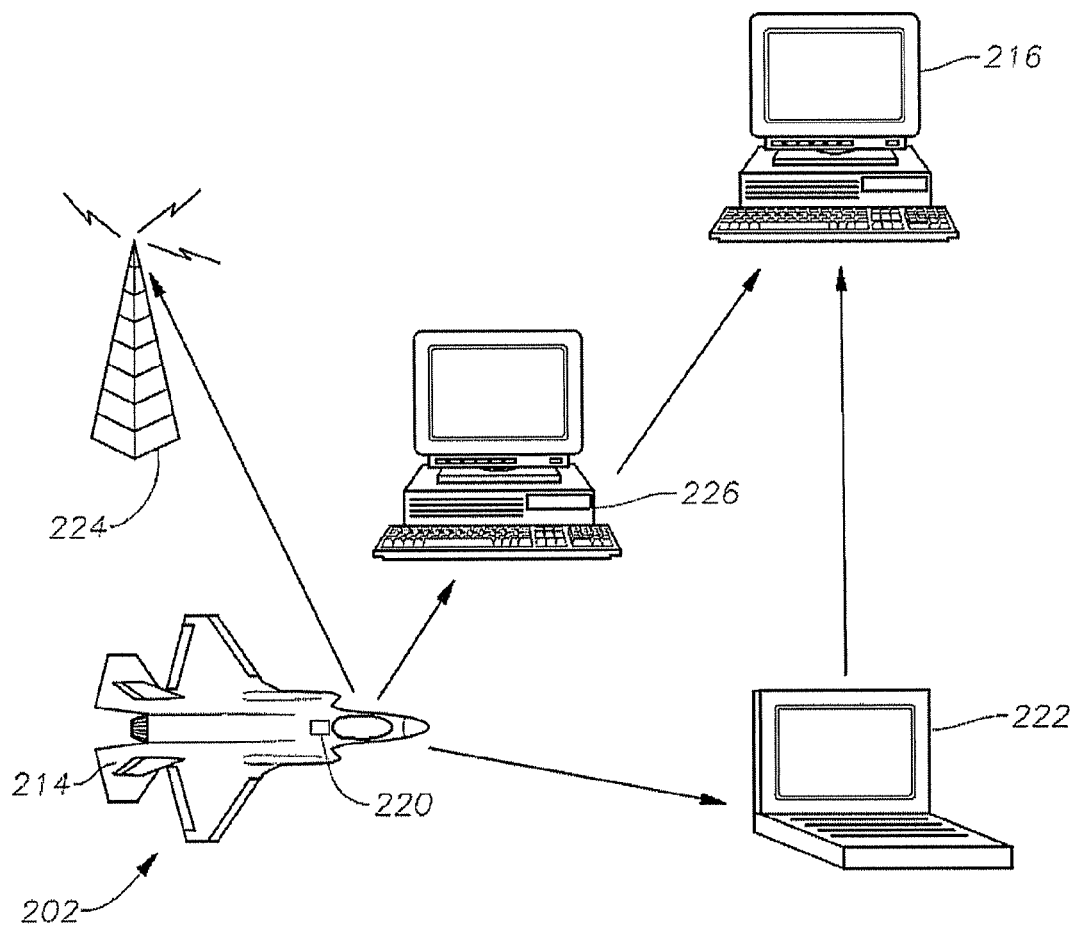
FIG. 2 is an illustration of an exemplary embodiment of a synthetic redundancy system.

Referring to FIG. 2, a computer 216 with a prognostic health management ("PHM") algorithm monitors a variety of data regarding a SRC 214. The data may come from sensors within the SRC 214, sensors and telemetry from the aircraft 202, and maintenance information 222. The off board maintenance information 222 may include, for example, the number of hours the SRC 214 has operated, maintenance history of the aircraft, and the like. The sensor and telemetry data from the aircraft 202 may be transmitted through a communication device 224 to the off-board PHM computer 216, or the data may be downloaded from the aircraft to a data collection device 226 and sent to the PHM computer 216 at a later time.

The off board PHM computer 216 processes the data from the various sources and applies it to the PHM algorithm. The algorithm indicates whether to replace the SRC 214. The on-board computer 220, which could be the vehicle management computer or flight control computer, may apply a PHM algorithm to make real-time mission decisions such as, for example, whether to abort a flight, shorten the duration of the flight, etc. The on-board computer 220 may use any information about the SRC 214 including, for example, efficiency and responsiveness.

Figure 3:
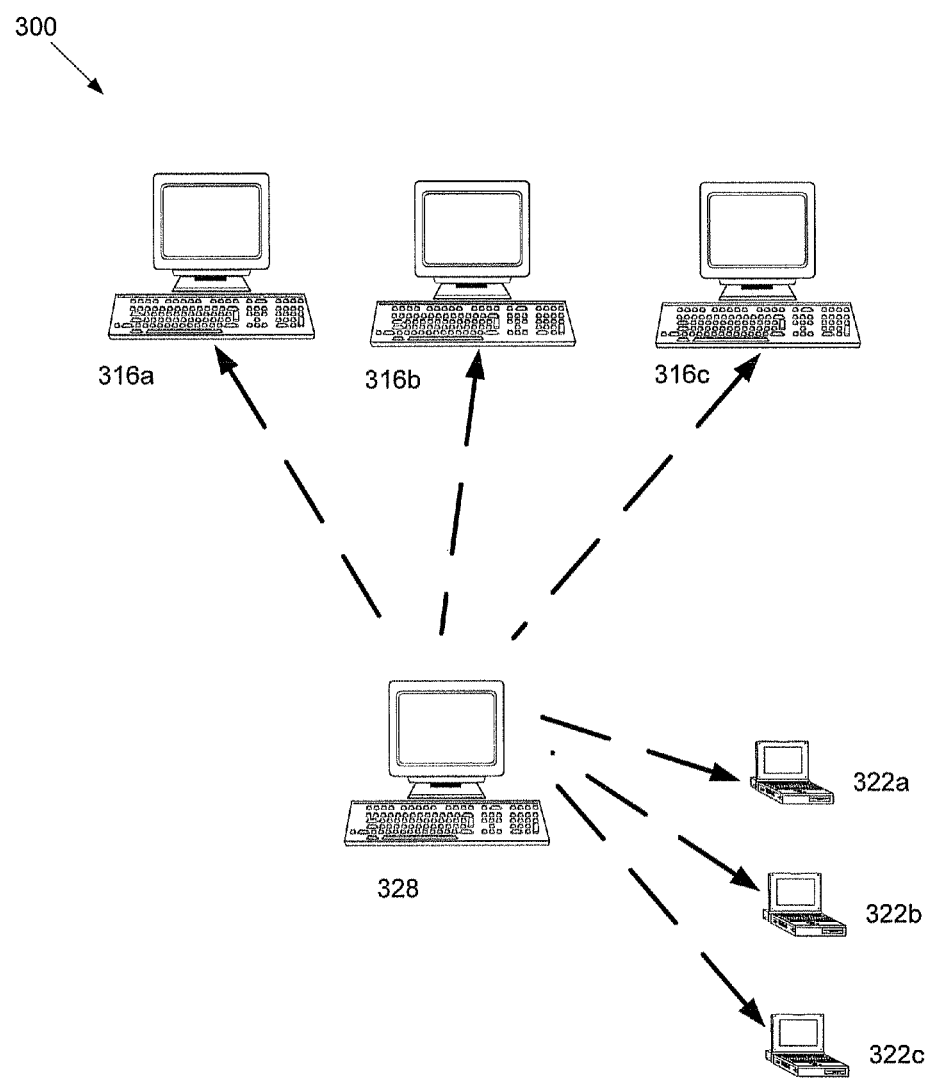
FIG. 3 is an illustration of the computer system component of an exemplary embodiment of the synthetic redundancy system.
Figure 4A:
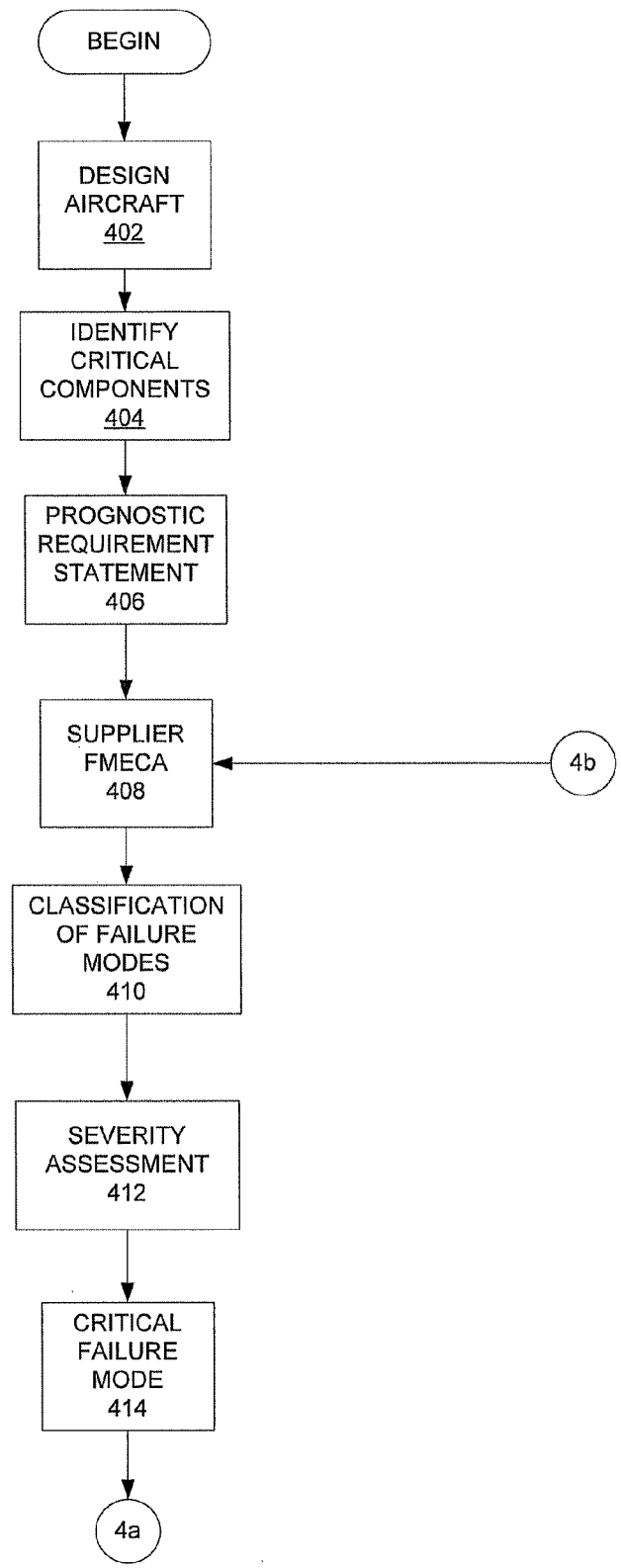
FIGS. 4a, 4b, 4c, and 4d are flowchart illustrations of an exemplary embodiment of the synthetic redundancy system.
Figure 4B:
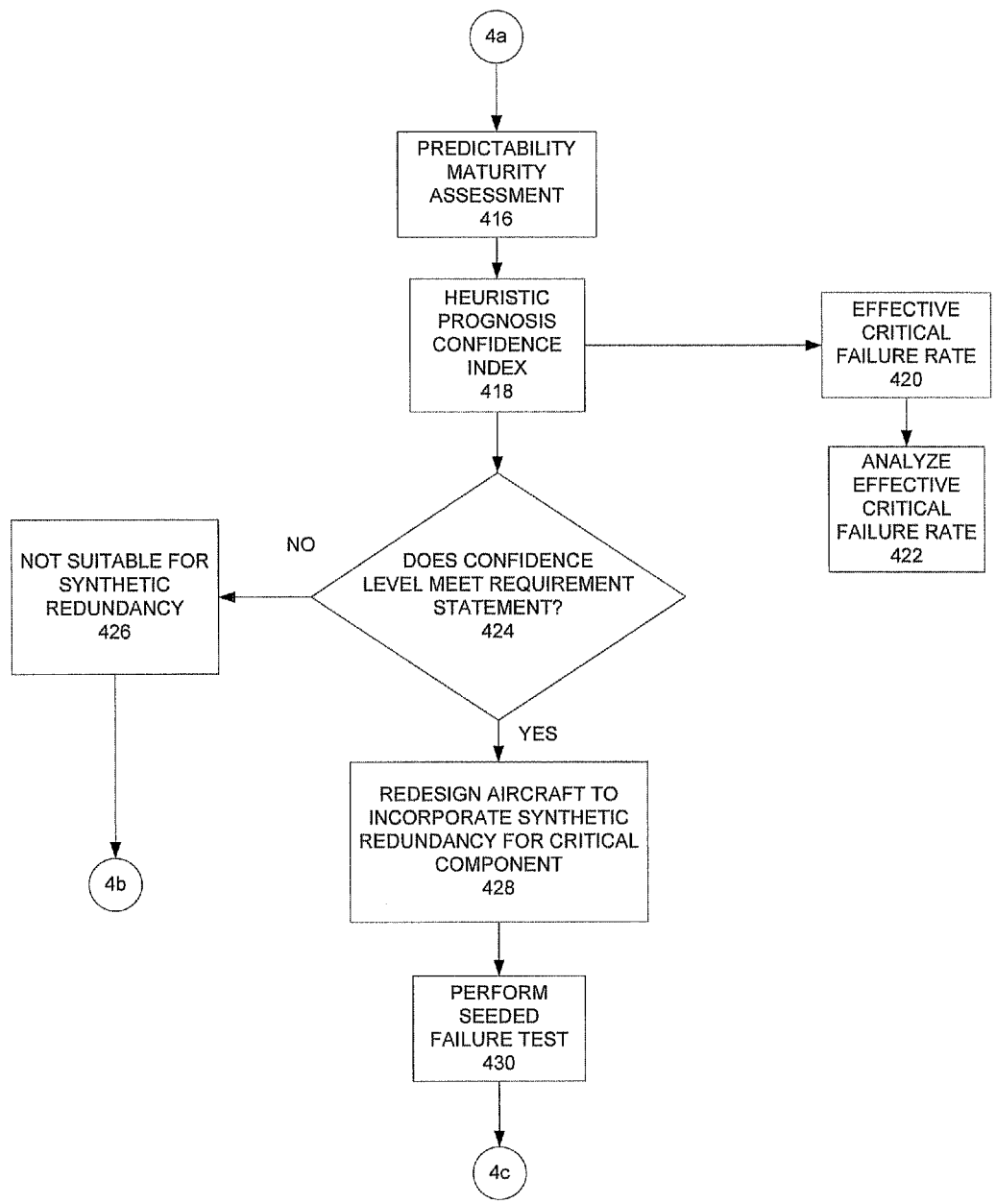
Figure 4C:
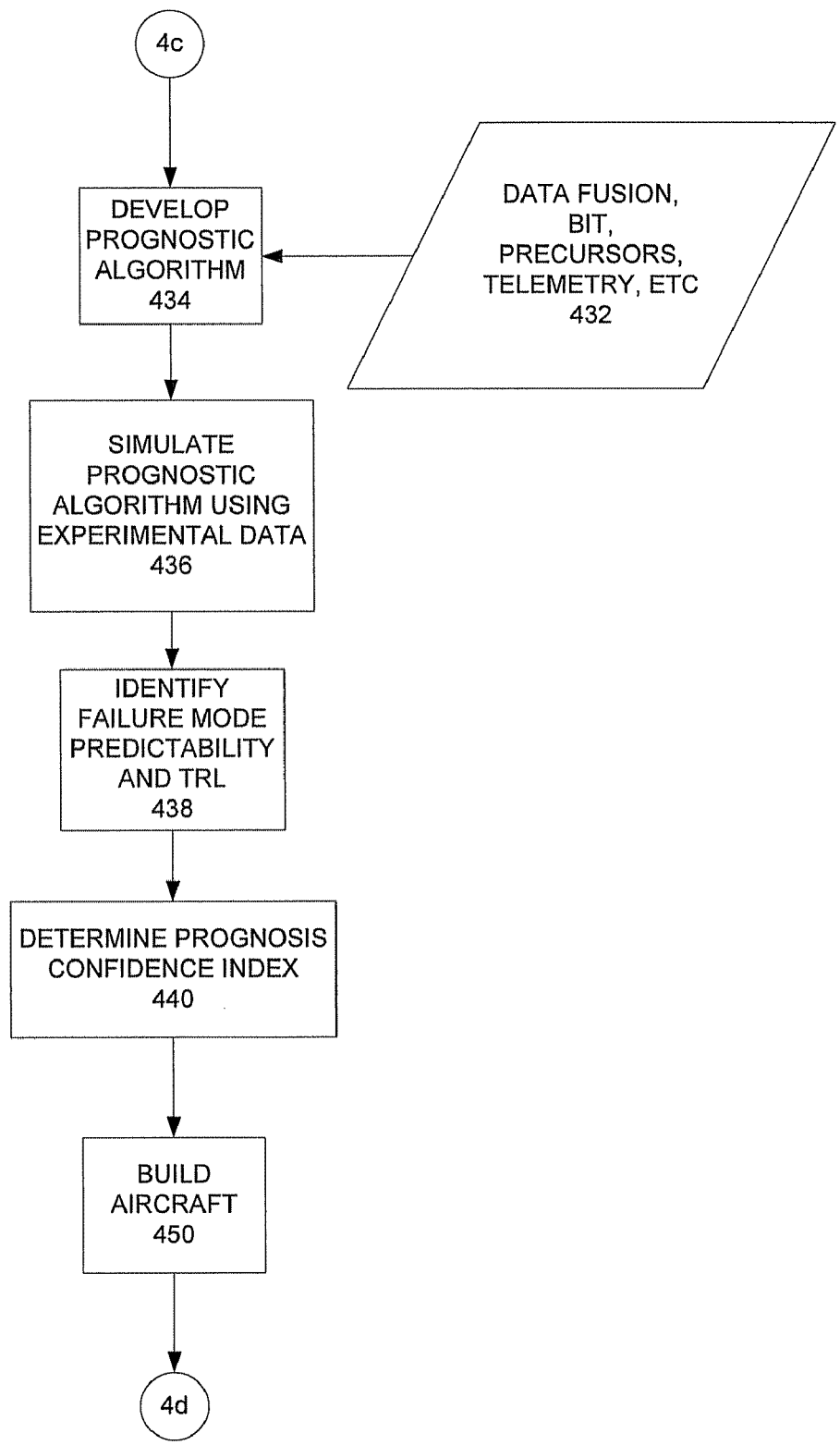
Figure 4D:
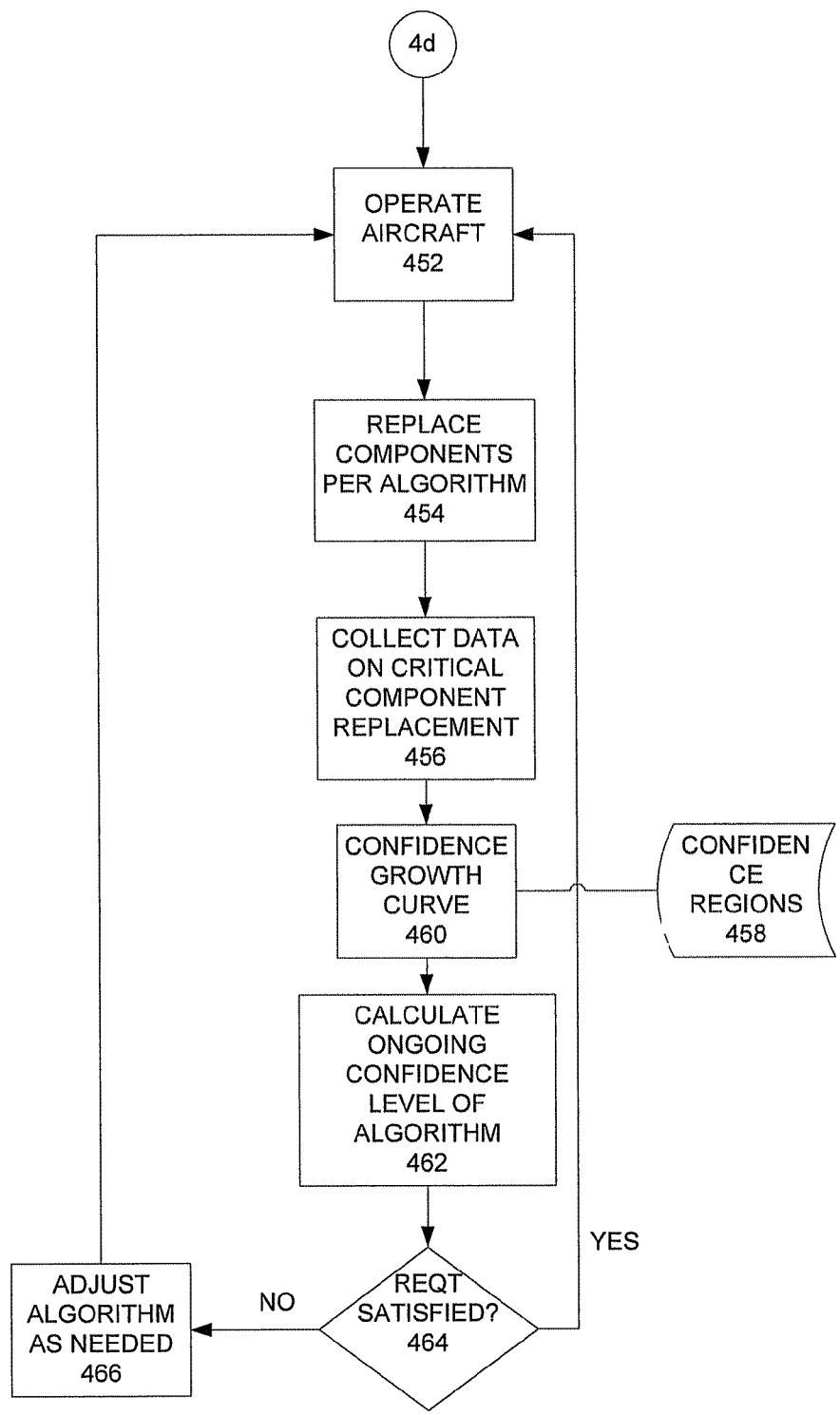

Referring to FIG. 3, data from one or more PHM computers such as 316a-316c, as well as field maintenance data computers 322a-322c, is compiled on a statistical processing computer 328 to determine whether the algorithm is meeting its objective. The statistical processing computer 328 can have a program product stored on a computer readable medium that, when read by the computer 328, causes the computer 328 to perform the steps described herein. The system 300 for synthetic redundancy establishes a requirement for replacement and a confidence level to indicate whether the algorithm is meeting the requirement. A "failure" is an installed part that stops working prior to replacement. A part may have multiple "failure modes" where each failure mode is a manner in which the part or system could fail. A requirement and confidence level could be, for example, to avoid 95 percent of the failures of a particular SRC with a 90 percent confidence level. The means of determining the requirement and confidence level will be described below.

FIGS. 4a, 4b, 4c, and 4d represent a single flowchart that is presented on four pages for legibility. As one of ordinary skill will appreciate, the circles containing alpha-numeric characters, within the flowchart, represent a connector instructing the viewer of the flow chart to go to the corresponding connector, having the same alpha-numeric character. For example, when the flow chart leads to the "4a" connector, in a circle on FIG. 4a, the viewer should go to the "4a" connector, in a circle on FIG. 4b, and continue following the flow chart. Referring to FIGS. 4a, 4b, 4c, and 4d, a synthetic redundancy system begins with an initial design of the aircraft 402. During and after the initial design, critical components are identified 404. A critical component is, for example, a component that is necessary for the continuing operation of the aircraft. The definition of critical component depends on the requirements of the aircraft user. A safety critical component could be, for example, one that may result in the loss of the aircraft if the component fails during operation. A mission critical component could be a component that, if it fails, prevents the aircraft from completing its intended mission but does not result in the loss of the aircraft.

A prognostic requirement is determined in 406. The requirement can be determined by, for example, a multi-discipline team that is familiar with aircraft reliability and safety requirements. The multi-discipline team could include, for example, reliability experts, safety experts, designers, engineers, technicians, and the like. In an exemplary embodiment, a multi-discipline optimization ("MDO") process is used to create the prognostic requirement statement. In an exemplary embodiment, the requirement statement could require that the prognostic indicator avoid a certain percentage of failures. A failure is a component that fails during use. To avoid being too conservative, the prognostic requirement may also mandate that the prognostic indicator allow a certain percentage of failures. The prognostic requirement may also specify a confidence level required for the prognostic indicator.

A supplier Failure Mode Effects and Criticality Analysis ("FMECA") is performed in 408. The supplier may be the manufacturer of the component and may have significant knowledge regarding the failure modes of the component. Items of interest from a supplier FMECA include (1) mean time between failure ("MTBF") for each component and assembly, (2) failure mode assessment for each component, (3) failure mode probability assessment for each component, and (4) built in test ("BIT") effectiveness assessment. In an exemplary embodiment, the supplier FMECA creates a list of possible failure conditions for the component.

Failure mode severity classifications are established in 410. Severity classes could include, for example, "Catastrophic," "Impaired," "Marginal," "Minimal," and "Negligible." An example list of severity classes and definitions for an exemplary embodiment is shown in Table 1, but the classes and definitions may vary.

TABLE 1

| Severity Class | | Aircraft Level Definition | EMA/EU Level Definition |
| --- | --- | --- | --- |
| Catastrophic | 5 | Failure which results in inability of aircraft to maintain controlled flight and loss Aircraft. | Failure which causes the aerodynamic surface to fail with stiffness in a position away from neutral or significantly reduced stiffness |
| Impaired | 4 | Failure which results of loss of a control surface function of the Aircraft. Control reconfiguration allows return home. | Failure which prompts the fail-safe condition, allowing the aerodynamic surface to move to the neutral position. |
| Marginal | 3 | Failure which results in significantly reduced performance and margin in one or more areas. Aircraft able to return home. | Failure which results in significant performance loss and margin. |
| Minimal | 2 | Failure which has minimal effect on mission performance. Aircraft able to complete mission. | Failure which results in minal performance loss and margin |
| Negligible | 1 | Failure which results in no affect on the mission. A maintenance event may be required if detected. | A non-functional failure or a failure that has no discernable operational effect. |

A Failure Mode Severity Assessment is performed in 412. The Failure Mode Severity Assessment assigns a Severity Class (from step 410) to each of the failure conditions identified by the Supplier FMECA 408 and results in a list of Critical Failure Modes 414.

Certain assumptions may be made regarding the air vehicle design and resulting consequences of the failure mode. For example, an assumption could be made that a total failure of a critical flight control actuator will result in the loss of an aircraft.

A Failure Mode Predictability/Maturity Assessment is performed in 416. The predictability and maturity of a component may be defined in any manner useful in quantifying the predictability of failure and maturity of a component. The predictability of a failure could be assigned a number based, for example, on the number of pre-failure indicators or warning signs that occur prior to a component's failure. An example of a list of predictability values is shown in Table 2. A score of 1, for example, indicates that no pre-cursors occur prior to failure and thus the failure is more likely to occur without any warning. A score of 4, for example, indicates at least two observable failure pre-cursors will occur prior to a failure.

TABLE 2

| Predictability | Maturity |
| --- | --- |
| 5 = 3 Observable Failure Pre-Cursors | 5 = TRL 9 |
| 4 = 2 Observable Failure Pre-Cursors | 4 = TRL 7-8 |
| 3 = 1 Observable Failure Pre-Cursors | 3 = TRL 5-6 |
| 2 = Estimated Failure Pre-Cursors | 2 = TRL 3-4 |
| 1 = No Observable Failure Pre-Cursors | 1 = TRL 1-2 |

Similarly, in an exemplary embodiment, the maturity of the technology is assigned a quantifiable score to reflect the Technology Readiness Level ("TRL"). An immature technology is less likely to be predictable regarding when or how a component might fail due to a variety of reasons including, for example, inadequate data and insufficient experience with the component. An example of TRL definitions is provided in Table 3. A maturity score of 1, for example, indicates a component's TRL is low. The TRL definitions may be different from Table 3 when, for example, PHM is used for non-aircraft equipment or when governing bodies mandate different definitions.

TABLE 3

| Technology Status | Technology Level |
| --- | --- |
| Basic Research | 1. Basic Principals Observed and Reported |
| | 2. Technology Concept and/or Application Formulated |
| Research to Feasibility | 2. Technology Concept and/or Application Formulated |
| | 3. Analytical and Experimental Critical |
| Technology Development | 3. Analytical and Experimental Critical Function and/or Characteristic Proof of Concept |
| | 4. Component and/or Breadboard Validation in a Laboratory Environment |
| | 5. Component and/or Breadboard Validation in a Relevant Environment |
| Technology Demonstration | 5. Component and/or Breadboard Validation in a Relevant Environment |
| | 6. System/Subsystem Model or Prototype Demo in a Relevant Environment |
| System/Subsystem Development | 6. System/Subsystem Model or Prototype Demo in a Relevant Environment |
| | 7. System Prototype Demonstration in Operational Environment |
| | 8. Actual System Completed and "Flight Qualified" Through Test and Demonstration |
| System Test and Operations | 8. Actual System Completed and "Flight Qualified" Through Test and Demonstration |
| | 9. Actual System "Flight Proven" Through Successful Mission Operations |

The next step in an exemplary embodiment is to create a heuristic Prognosis Confidence Index 418 for each critical failure mode 414. In an exemplary embodiment, the heuristic prognosis confidence index for a particular failure could be defined as the product of the predictability and maturity indices normalized by a maximum value.

The prognosis confidence index for a given component is then used to adjust the predicted reliability for each component critical failure mode and thus calculate the effective critical failure rate in 420. The effective critical failure rate is the rate at which an installed component can be expected to fail. The effective failure rate may be used to compare the reliability of the synthetically redundant aircraft to the failure rates of traditional, physically redundant aircraft 422. The operator of equipment may have various reliability requirements. For aircraft, these requirements could include the probability of loss of aircraft ("PLOA") and/or a Failure Immunity level.

The calculated heuristic prognostics confidence level can be compared to the required prognostics effectiveness levels from the optimization process to assess the feasibility of synthetic redundancy for the particular application 424. The heuristic confidence level can illustrate the potential accuracy of the PHM algorithm. At this point, the prognostics confidence level is synonymous with the prognostics effectiveness required from the optimization process. If the heuristic confidence level is too low, then the component may not be suitable for synthetic redundancy 426. If the heuristic confidence level is high enough, then the synthetically redundant system may proceed with, for example, redesigning the aircraft to remove the redundant component 428. The heuristic confidence level is useful for predicting whether the aircraft, using synthetic redundancy, will meet the PLOA and Failure Immunity levels.

One or more seeded failure tests may be performed in 430. Seeded failure testing may occur in a laboratory environment. The seeded failure tests test components and identify failure times and conditions. The data from the seeded failure test may be used to identify features and trend characteristics regarding how, when, and why a component may fail. The data may also show failure rates for particular components. This data may be applied to other similar parts and components. Seeded failure testing is not used in some embodiments. Data could also come from durability testing, previous testing of the same or similar components, etc.

In an exemplary embodiment, the seeded failure testing also identifies precursors or observable indicators of an impending component failure. Observable precursors may include, for example, efficiency, frequency response, coherence, BIT, age of component, hours of use, etc. Precursors may also be identified by means other than seeded failure testing.

The data from the seeded failure tests 430 and all other known data regarding the failure of the component such as FMECA 408 and data from sensory indicators is fused together by a computer 432. Sensory indicator data can include information regarding, for example, actuator position, vibration, temperature, stress/strain, accelerometer, acoustic, and the like. A computer uses the data to create a prognostic algorithm to predict the nature and frequency of a component failure in 434. In an exemplary embodiment, the prognostic algorithm predicts the Remaining Useful Life ("RUL") of a component based on factors such as the precursors to failure, age of the component, failure history, aircraft telemetry, failure history, sensory data, and the like. The RUL algorithm may then be used to direct the replacement of a component if the RUL falls below a threshold level. In an exemplary embodiment, the threshold level is a predetermined period of time such as, for example, the length of the next deployment, the length of the maximum flight duration of the aircraft, or a fixed number of hours.

In some embodiments, experimental data may be compared to simulated prognostic algorithm results to validate the algorithm's ability to predict failures in 436. A computer is used to consider component failures and then determine whether the prognostic algorithm would have indicated replacement of the part prior to the component failure had the prognostic algorithm been in use prior to the failure.

In an exemplary embodiment, the failure mode predictability and technology readiness levels are determined in 438. The failure mode predictability considers, for example, the number of observable indicators of an impending failure. The observable indicators could be any precursor, metric, or warning sign that occurs prior to failure such as, for example, increased operating temperature, component vibrations, increased power consumption, built-in test results, and the like.

In 440, a prognosis confidence index is calculated by considering multiple data points such as seeded failure test data, FMECA, and TRL. The confidence index is a range based on the number of failures avoided by the algorithm. The confidence index could be, for example, avoidance of 98% of failures. This confidence index means that 2% of failures would occur prior to algorithm mandated component replacement. The other 98% of components that would have failed are avoided.

The prognosis confidence index also requires the calculation of a confidence level. The confidence level is the statistical confidence that the range specified in the confidence index is being met.

In an exemplary embodiment, an aircraft using synthetic redundancy is built, or an existing aircraft is modified to incorporate synthetic redundancy in 450. The aircraft is then operated in 452, which may include takeoffs, landings, flight, etc. Operate 452 may also include storing the aircraft, transporting the aircraft, fueling the aircraft, and performing maintenance on the aircraft. The definition of "operate" varies depending on the type of equipment. A machine for manufacturing computer chips, for example, could operate by processing silicon wafers. A bulldozer, for example, could operate by pushing soil.

Components managed by PHM as part of the synthetic redundancy process are replaced according to the algorithm in 454. The replacement occurs prior to the failure of the component. The algorithm uses field data and information about the component to calculate the RUL of the component. When the RUL falls below a threshold level, the algorithm indicates to replace the part. Computers may be used to determine the RUL of the component. The computer could be, for example, an off-board computer 216 (FIG. 2) that calculates the RUL. The threshold amount of time could be, for example, a period of time greater than the length of one mission. The computer determining the RUL could be an on-board computer such as a vehicle management computer, an equipment controller, and the like. The threshold amount of time could be the length of one mission, one cycle, or a pre-determined period of time such as the length of time required to safely land an aircraft or the length of time required to shutdown a piece of manufacturing equipment.

The component is replaced, for example, by a technician or repairman that removes the component from the aircraft and replaces it with a new component. The component that was removed may be sent for testing or to be remanufactured.

In an exemplary embodiment, field data is collected regarding component replacement in 456. Field data includes, for example, the number of components replaced prior to failure (as directed by the algorithm) and the number of components replaced due to failure. The data could also include post-replacement testing and failure analysis testing.

In an exemplary embodiment, confidence regions 458 are calculated to determine the number of replacements and the number of failures required to validate the confidence level of the algorithm. The confidence regions show the minimum amount of data required to verify a prognostic algorithm.

In an exemplary embodiment, a confidence growth curve is determined by a computer to compare the actual confidence level based on field data to the expected or minimum confidence level in 460. If the actual confidence level based on field data falls below the minimum confidence level determined by the prognostic algorithm requirement statement then the algorithm is no longer meeting the requirement.

The ongoing confidence level is calculated in 462. This confidence level is based on a statistical analysis of field data. The confidence level is then compared to confidence level required by the prognostic algorithm requirements statement in 464. If the algorithm is not meeting the requirement, then the algorithm must be adjusted in 466 to more accurately reflect the remaining useful life of the component. If the requirement is met in 464, then the cycle of operation and data collection continues at 452.

The sequence of the flowchart in FIGS. 4a, 4b, 4c, and 4d may vary. For example, the step of building the aircraft may come before or after the seeded failure testing. Similarly, the step of designing the aircraft may come after seeded failure testing for a component.

Cost Benefit

Safety critical systems generally require physical system redundancy in order to meet reliability requirements. The reliability requirements for manned aircraft generally consist of Probability of Loss of Aircraft ("PLOA") which is a time dependant criterion, and Failure Immunity which is a system design criterion that addresses the consequences of failures. In order to balance a system design to meet these requirements at the lowest weight/cost, levels of physical system redundancy are balanced or traded against required component reliability.

In an exemplary embodiment, synthetic redundancy is used to minimize the weight and life cycle cost subject to certain reliability constraints. The reliability constraints could be, for example, failure immunity, mission reliability, and mission availability. However, depending on the particular air vehicle design and user requirements, any of the reliability constraints could be formulated as optimization functions with life cycle cost and weight as constraints. Customer requirements may also dictate other formulations of these parameters as optimization functions or constraint functions.

One embodiment uses a methodology for optimizing an air vehicle configuration to minimize weight and life cycle cost via synthetic redundancy. In an exemplary embodiment, the design of an aircraft is optimized by using techniques associated with formulating the optimization problem for synthetic redundancy, and modeling the influence of synthetic redundancy on life cycle cost and reliability. One of the techniques employed includes associating prognostic effectiveness with a standard mean time between critical failures ("MTBCF") for a hardware component. This association provides the path for computing the increased effective reliability for a hardware component in order to perform the reliability modeling.

In an exemplary embodiment, prognostic effectiveness is defined as the percentage of critical failure modes that would be avoided by replacement of the component just prior to failure ("Prognostic Effectiveness" or "PHM Effectiveness"). By predicting a failure and replacing the component prior to failure, the rate of failure is effectively reduced. For example, assume a component has an MTBCF of 19266 hours. Assuming that the component's MTBCF is based on a constant failure rate, the failure rate (r) is then calculated as the inverse of the MTBCF or 5.19E-5. The failure rate is then adjusted for synthetic redundancy by multiplying it by the quantity (1-PHM Effectiveness). The adjusted or effective mean time between critical failure (MTBCFe) is then calculated by inverting the adjusted failure rate. To demonstrate, consider a prognostic algorithm effectiveness of 35 percent. The effective increase in MTBCF would be:

$$re=5.19E\text{-}5(1-0.35)=3.37E\text{-}5$$

$$MTBCFe=1/re=29640 \text{ hours}$$

By adjusting the failure rate as a function of prognostics confidence, the effects of synthetic redundancy are incorporated as an effective reliability increase, allowing traditional reliability methods to be used when performing a reliability analysis to support the cost benefit optimization process. This particular example assumes a 100% confidence in avoidance of the required percentage of critical failure modes.

The optimization methodology in an exemplary embodiment provides a basis for quantifying the cost versus benefits of synthetic redundancy based on assumed levels of prognostic confidence. Costs associated with the failure of an installed part may include loss of aircraft, unavailability of aircraft, unscheduled maintenance, expedited transportation of replacement part, stocking of spare parts, and the like. Costs associated with synthetic redundancy may include developing the algorithm, testing, replacement of parts prior to the end of the parts' useful life, and the like. Benefits of synthetic redundancy may include increased performance of aircraft, decreased fuel consumption of aircraft due to decreased weight, and increased mission availability. Disadvantages of synthetic redundancy may include decreased failure immunity if a safety critical part fails during operation. All of these factors may be modeled to find the optimal mix of physical and synthetic redundancy.

Figure 5:
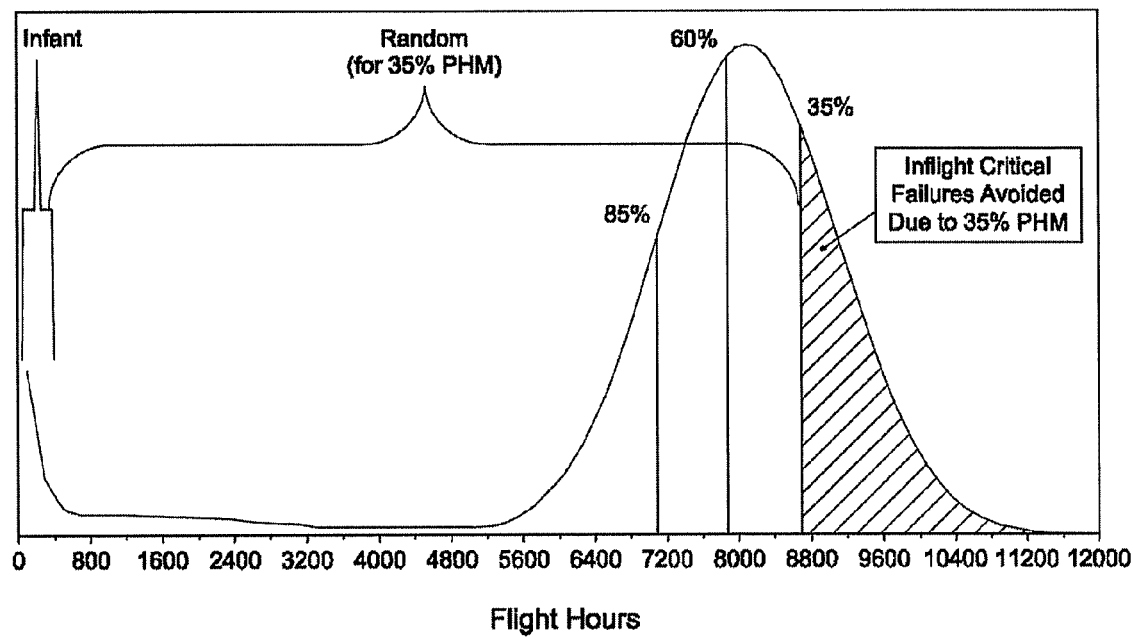
FIG. 5 is a graph based on sample data to illustrate how an exemplary embodiment could avoid a percentage of failures

One variable in the model must be the effectiveness of the prognostic health management algorithm. A more effective, or accurate, algorithm will have fewer failures of installed components, including fewer failures of safety critical components. Referring to FIG. 5, an example data set illustrates how a PHM effectiveness of 35% will avoid 35% of critical failures. Of all of the parts replaced, 35% are replaced before they fail, while 65% fail while installed in a system.

Confidence Levels

A prognostic algorithm may not be able to predict the remaining useful life of a component with 100% confidence for all critical failure modes. Indeed, if it could, then physical system redundancy would not be required at all for safety critical systems. However, since failures are probabilistic events, it is not possible to achieve 100% confidence. Therefore, it is necessary to determine the confidence level associated with predicting the remaining useful life of a component for its critical failure modes, and the percentage of critical failure modes that can be avoided.

A confidence measure is useful in determining whether a failure is likely to be prevented. However, there is no protection against 'overly conservative' predictions. For example, a prognostic algorithm which claims 20 hours time-to-maintenance every time it is run (even if there were actually hundreds or more hours of remaining useful life), would meet the requirement, as it would definitely catch 95% of all failures of that component. In an exemplary embodiment, there is an expectation that an accurately tuned prognostic algorithm would 'miss' some (small) percentage of failures. Thus, rather than requiring a prognostic statement to merely prevent a certain percentage of failures, an upper bound may be used to slightly reduce the total number of failures prevented.

In an exemplary embodiment, a confidence calculation determines the statistical confidence level that the algorithm will meet the parameters of the prognostic requirement statement. In an exemplary embodiment, the requirement statement may specify to avoid a certain percent of failures ("a") but to still allow a certain percent of failures ("b"). In an exemplary embodiment, the requirement statement could require the algorithm to avoid, for example, 90% of failures but to allow, for example, 2% of failures. Thus the requirement is to avoid 90-98% of failures. Any percentage may be specified. The confidence calculation formula is based on a binomial distribution using "f," the number of units that failed while installed, and "n," the number of units replaced (regardless of whether the unit failed or was replaced because of the prognostic indication). The confidence level is the likelihood, expressed as a percentage, that f is greater than or equal to a, and that f is less than or equal to b.

Verification

It is important to understand that this verification technique is not trying to determine how well the prognostic algorithm is determining the actual remaining useful life of a component (or, more generally, the shape of the predicted failure time). In fact, the prognostic algorithm does not even need to explicitly calculate the remaining life distribution. Rather, this approach to verification is based off the "avoid a specific percentage of failures" portion of the requirement statement. Specifically, whether the time-to-maintenance value (which the prognostic algorithm does provide) is adequately avoiding the specified percentage of failures.

The basic idea behind this approach is the expectation that the prognostic algorithm is, in fact, expected to "miss" a small percentage of failures. In an exemplary embodiment a requirement statement could be, for example, "avoid 95% of failures." An algorithm which satisfies the requirement will avoid at least 95% of failures; conversely, it will miss at most 5% of failures. So out of 100 replacements, the component can be expected to fail about 5 times. If the maintenance records indicate that there were actually 25 failures, the algorithm is not meeting the requirement.

In an exemplary embodiment, the prognostic algorithm being verified provides a minimum time-to-maintenance that satisfies the minimum time constraint of the requirement statement. There are several measures that may be output from a prognostic algorithm, including a best estimate of the remaining useful life, the shape of the remaining life distribution, and a best estimate of the time-to-maintenance for a given failure avoidance percentage.

In an exemplary embodiment, maintenance actions are planned based on the time-to-maintenance measures (that is, the part is replaced when indicated, even if it has not failed). In an exemplary embodiment, this requirement can be relaxed a little to provide for a "confidence building" period during which the prognostic algorithm is verified without the risk of excessive failures or unnecessary maintenance actions (over traditional maintenance planning techniques).

In an exemplary embodiment, data including the number of times a type of component has been replaced (either due to failure or prognostic indication) and the number of times the component failed before being replaced is available. Note that these maintenance measures can be aggregated over a large number of similar aircraft, which can lead to increased statistical significance (and potentially increased confidence) quicker than considering a single aircraft's maintenance history.

Figure 6:
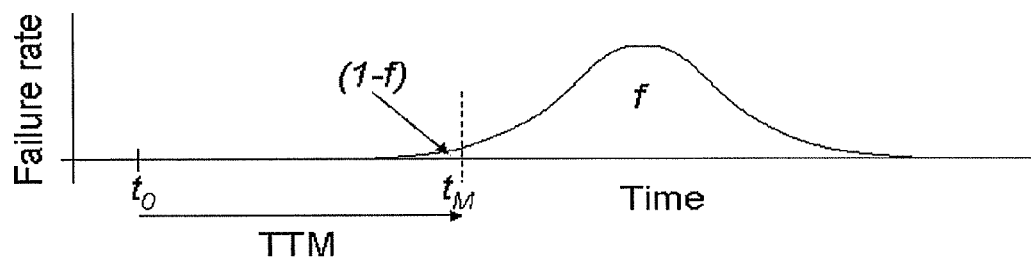
FIG. 6 is a graph of an exemplary embodiment showing failures avoided (f) if a prognostic algorithm directs replacement of a part at a given time (tM).

Referring to FIG. 6, an algorithm in an exemplary embodiment provides a consistent time-to-maintenance (TTM) measure which divides the failure rate probability distribution function ("pdf"). FIG. 6 depicts sample data and shows how the pdf may be divided, regardless of the shape of the distribution. In this figure, t0 is the time at which the prediction is made, tM is the maintenance time, and f is the percentage of failures that would be avoided by performing maintenance at the indicated time. Further, make the following definitions.

Let n be the number of components replaced (failed and not failed).

Let x be the number of those replaced components that failed before being replaced.

With these definitions, the probability of missing exactly x component failures is given by a standard binomial distribution.

Figure 7:
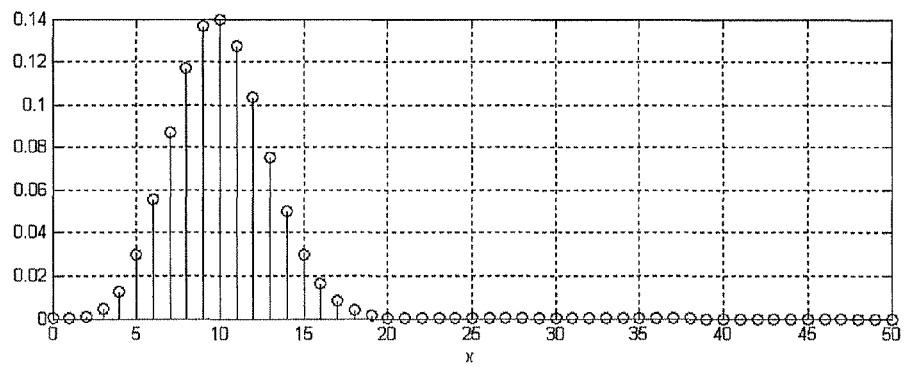
FIG. 7 is a graph of an exemplary embodiment showing a binomial distribution that indicates the likelihood of a given number of failures.

Statistical analysis can characterize the distribution of x based on given values for n and f. FIG. 7 is an example that shows this binomial distribution for n=50 and f=0.8. The y-axis shows the probability of x failures being missed by the equation. As expected, the highest probability of failure occurs at $x=nx(1-f)=50\times(1-0.8)=10$. Note that this is a discrete distribution; it is only defined on integer values of x. However, a different distribution can be calculated for every possible value of f between zero and one.

Figure 8:
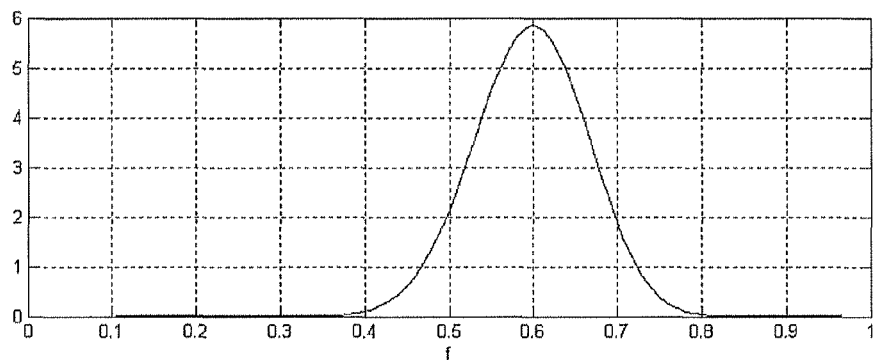
FIG. 8 is a graph of an exemplary embodiment showing a maximum likelihood estimate of a failure using a given prognostic requirement and a sample set of data.

If f is unknown, it can be estimated and expressed as the maximum likelihood estimate ("MLE") of f. As an example, the graph of the pdf for the maximum likelihood estimate of f for n=50 and x=20 is given in FIG. 8. In this example, if the prognostic requirement is to prevent 95-99 percent of failures, the confidence level is equal to the area under the curve between 0.95 and 0.99 on the x axis. The area under the curve is near zero, and thus there is almost no confidence that the algorithm will prevent 95-99 percent of failures.

Figure 9:
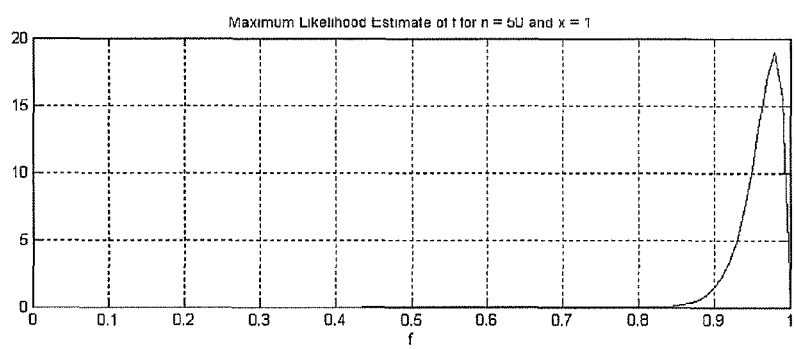
FIG. 9 is a graph of an exemplary embodiment showing a maximum likelihood estimate of a failure using a given prognostic requirement and a sample set of data.

Referring to FIG. 9, if n=50 and x=1, the MLE shifts to the right and the area under the curve includes the region between 0.95 and 0.99. In this case, the confidence that the failure avoidance is at least 95% is much higher (73.56% in this example).

Given the MLE distribution of f for a given value of n and x, the confidence that the actual value of f is a given value (or, more accurately, that the actual value is within a range of values) can be found by calculating the area under the MLE distribution for that range.

In an exemplary embodiment, the verification of the prognostic algorithm may be a confidence level of identifying a range of failures. For example, the prognostic algorithm could provide a minimum of 20 hours time-to-maintenance such that between 95% and 99% of failures of a specific component will be avoided with 90% confidence. If there are too few failures of installed components (x=small) for a given number of replacements (n), then the algorithm is too conservative for failing to allow 1% of failures. In an exemplary embodiment, the number of data points required can be calculated by a computer by solving the integral in a confidence level calculation. In an exemplary embodiment, a computer can create a table with the results for various numbers of x and n so that the required number can be found in the table rather than performing the calculation for every application.

Data Requirements

Figure 10:
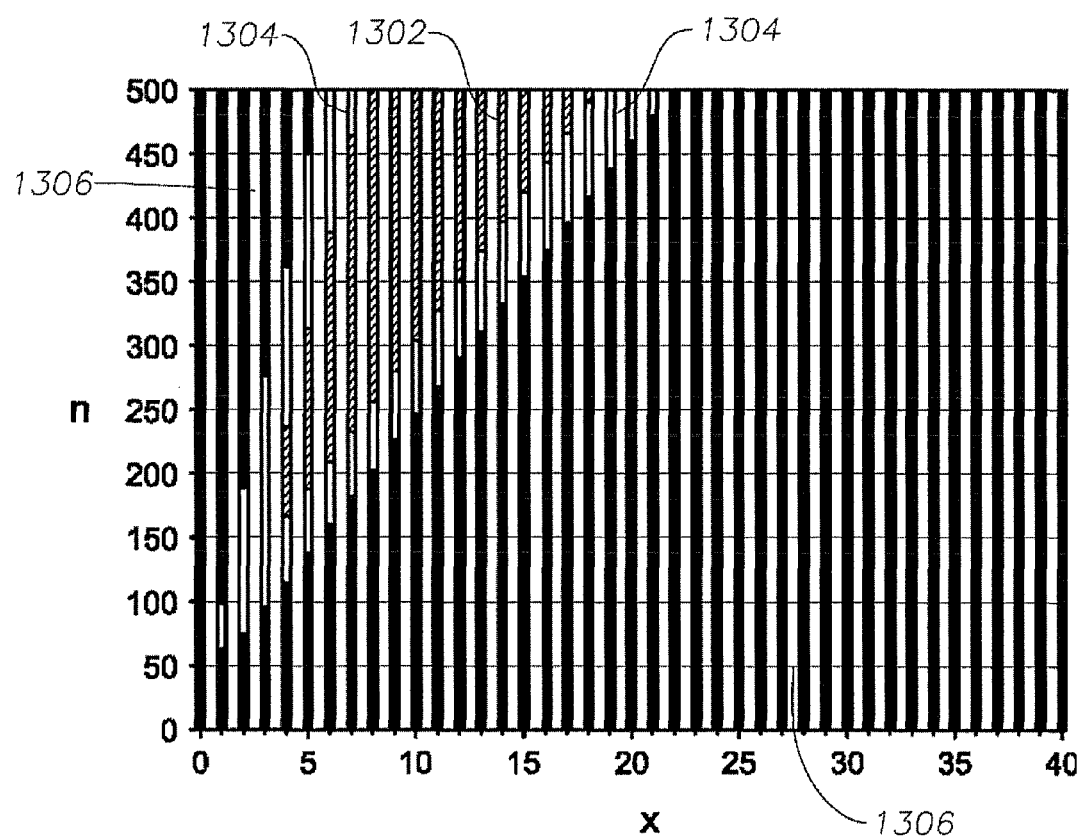
FIG. 10 is a graph of an exemplary embodiment showing confidence regions for a given number of replacements and failures.

Referring to FIG. 10, it is often desirable to know how much data will be required to verify a requirement. Such knowledge can be useful when scheduling and allocating resources to the verification task. To show how this information can be derived from this verification technique, consider a component with the following prognostic requirement: The prognostic algorithm shall provide a minimum of 20 hours time-to-maintenance such that between 95% and 99% of failures of the component will be avoided with 90% confidence.

The confidence region chart depicted in FIG. 10 is based on exemplary data. A confidence region chart shows the confidence level associated with a given number of failures out of a given number of replacements. In the chart, x shows the total number of failures and n shows the total number of replacements (due to failures and due to PHM replacement). For a given confidence level, if there are x number of failures of an installed component, there must have been n number of replacements. Thus n minus x shows the number of replacements based on the algorithm. The first region 1302 shows a 90 percent confidence prediction that the algorithm will avoid 95 percent of failures and allow one percent of failures. In the second region 1304, the confidence level drops to 70 percent. The third region 1306 shows a less than 70 percent confidence.

As can be seen, for some values of x 1306, there is no value of n which can be shown to satisfy the prognostic requirement. Moreover, consider the case where x=4. The prognostic requirement is satisfied only if n is between 168 and 237. Thus, if the prognostic algorithm is too conservative (and there have been more than 237 replacements for 4 failures), the confidence will drop below the threshold. Thus, a prognostic requirement written as shown above is not only verifiable from maintenance record data, but it also provides a means of identifying algorithms which are potentially too conservative in their time-to-maintenance predictions.

If there are a high number of failures then, statistically, a significantly high number of predictive replacements are required to validate the algorithm. In other words, the more failures that occur, the more replacements must have been performed to meet the requirement.

Confidence Growth Curve

Figure 11:
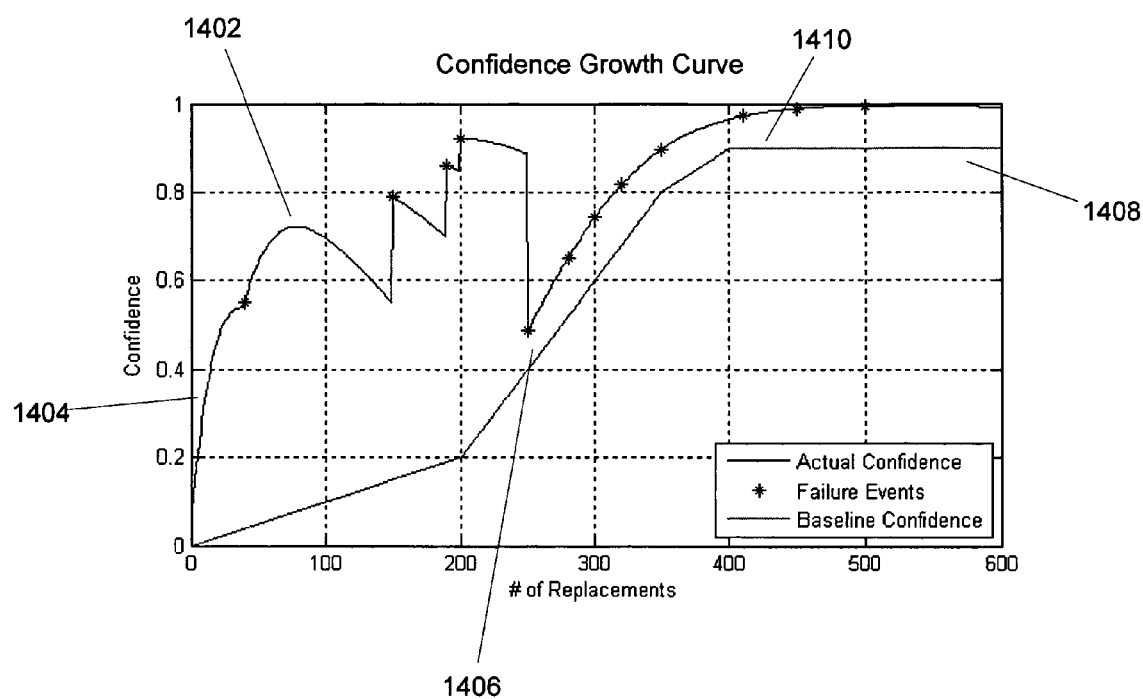
FIG. 11 is a graph of an exemplary embodiment showing an example of a confidence growth curve.

Referring to FIG. 11, in an exemplary embodiment, the confidence curve is adjusted as additional data becomes available. FIG. 11 is an example of data points adjusting a confidence interval. The top line in FIG. 11 shows a typical confidence growth curve for a prognostic algorithm. For this example, it is assumed that failures occur at the 40th, 150th, 190th, 200th, 250th, 280th, 300th, 320th, 350th, 410th, 450th, and 500th replacements. All other replacements were scheduled in accordance with a prognostic algorithm time-to-maintenance prediction.

As FIG. 11 shows, the confidence starts out low 1404 and tends to increase as more data points are acquired. When a failure event occurs (and the associated un-predicted maintenance replacement), the confidence drops 1406, particularly in the beginning when there are few data points. However, as the number of replacements increases, the effect of a failure event on the confidence curve is dampened.

The confidence growth curve 1402, along with a baseline confidence curve 1408, can be used to bound the time and data required for verification, as well as to provide a means of declaring a verification as failed. The baseline confidence 1408 curve is a minimum confidence bound for the actual confidence curve. The shape of the baseline curve 1408 would be specified based on specific knowledge of the algorithm being verified. In general, though, it would tend to be pessimistic initially to allow for large swings in the confidence.

In order for a prognostic algorithm to be verified, it would not only have to reach the desired confidence, but also do so without going below the baseline curve 1408. If the actual confidence does dip below the baseline curve 1408, the verification could be considered failed. An added benefit of the approach is that the baseline curve can constrain how much time is available for an algorithm to reach verification. For example, in FIG. 11, the baseline confidence requires that the algorithm reaches verification (90% confidence) no later than by the 400th replacement 1410.

The confidence growth curve can also be used to determine when to start relying on a prognostic algorithm. Often, particularly for a new prognostic technique, there can be reluctance to schedule maintenance on a part based on the prognostic prediction. In these cases, traditional maintenance concepts can initially be employed while a hypothetical confidence curve is tracked on the side. The hypothetical curve would assume that the prognostic prediction was acted upon. Similarly, if a failure occurred that the algorithm did not predict, the hypothetical confidence curve would be penalized accordingly. When and if the hypothetical confidence reaches a pre-determined threshold of acceptance, maintenance can start being scheduled based on the prognostic prediction instead of the traditional means

CONCLUSION

Synthetic Redundancy via prognostics is an approach to reducing weight and life cycle cost for systems requiring high reliability. A comprehensive methodology addresses the critical issues associated with incorporation of synthetic redundancy, and makes it feasible for implementation. Specifically, (1) an optimization approach to determining the prognostics confidence required and optimal mix of prognostic and physical system redundancy to meeting reliability requirements, (2) a methodology for determining the feasibility of a system component to meet prognostic confidence levels required to implement synthetic redundancy for a system, and (3) a methodology utilizing field data for verifying prognostic algorithm performance for meeting required prognostics confidence levels.

This methodology is not limited to safety critical systems. It is applicable to any system design where reliability requirements may dictate physical system redundancy. The methodology is not limited to mechanical systems. It can be utilized for electrical systems or any system that has to meet reliability requirements that dictate physical system redundancy. Finally, the methodology is not limited to aircraft. Synthetic redundancy can be used for any type of equipment.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. One or more elements of the exemplary embodiments may be combined, in whole or in part, with one or more elements of one or more of the other exemplary embodiments. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed:

1. A method for optimizing the design and operation of equipment, comprising:
    identifying a redundant component;
    replacing the redundant component with a single component;
    determining a remaining useful life of the single component;
    replacing the single component when the remaining useful life reaches a predetermined amount of time; and
    calculating a statistical confidence level that the single component will be replaced prior to failure.

2. The method of claim 1, wherein the equipment comprises a vehicle.

3. The method of claim 1, wherein the statistical confidence level is based on a quantity of failed components and a quantity of replaced components.

4. The method of claim 1, wherein the predetermined amount of time is calculated to allow at least a predetermined percentage of failures.

5. The method of claim 1, wherein the mean time between failures of the single component is not greater than the mean time between failures of the redundant component.

6. The method of claim 1, further comprising:
    determining a minimum statistical confidence level; and
    determining a quantity of data required to verify the statistical confidence level, the quantity of data comprising the number of failures of the single component and the number of replacements of the single component.

7. The method of claim 1, wherein the remaining useful life is calculated by a computer attached to the equipment.

8. The method of claim 1, wherein the remaining useful life of the component is greater than a predetermined amount of time.

9. The method of claim 8, wherein the equipment comprises an aircraft and wherein the predetermined amount of time is greater than the length of one flight.

10. A program product stored on a computer readable medium that, when read by a computer, causes the computer to perform the operations of:
    determining a remaining useful life of a non-redundant critical component, the critical component being installed on a piece of equipment;
    ordering the replacement of the non-redundant critical component when the remaining useful life reaches a predetermined amount of time; and
    calculating a statistical confidence level that the non-redundant critical component will be replaced prior to failure.

11. The program product of claim 10, wherein the determination of the remaining useful life of the non-redundant critical component comprises analysis of failure precursor data.

12. The program product of claim 11, wherein the mean time between failures of the non-redundant critical component is not greater than the mean time between failures of a redundant critical component, the redundant critical component performing the same operation as the non-redundant critical component.

13. The program product of claim 11, wherein the remaining useful life of the component is greater than a predetermined amount of time.

14. A computer implemented method of manufacturing a piece of equipment, the method comprising:
    (a) identifying a critical component on a piece of equipment;
    (b) building the piece of equipment, wherein the piece of equipment does not have a redundant component for the critical component;
    (b) creating an algorithm that estimates a remaining useful life of the critical component;
    (c) determining a maximum allowable failure rate for the critical component;
    (d) replacing the critical component when the remaining useful life reaches a predetermined amount;
    (e) determining an actual failure rate from the number of the critical components that fail prior to replacement and the number of the critical components that are replaced; and
    (f) using the algorithm so long as the actual failure rate does not exceed the maximum allowable failure rate.

15. The method of claim 14, wherein the mean time between failures of the critical component is not less than the mean time between failures of a redundant critical component.

16. The method of claim 14, wherein the critical component comprises a sub-component of another critical component.

17. The method of claim 14, further comprising determining a minimum allowable failure rate.

18. The method of claim 14, wherein the piece of equipment comprises an aircraft.

19. The method of claim 14, wherein the piece of equipment is not a vehicle.

20. The method of claim 14, wherein and actual confidence level based on failure and replacement data is compared to a theoretical confidence level.

* * * * *